Nov. 29, 1960     T. B. CAMPBELL ET AL     2,962,241
COMBINED COIL HANDLING AND SELF ALIGNING UNCOILING APPARATUS
Filed April 10, 1959
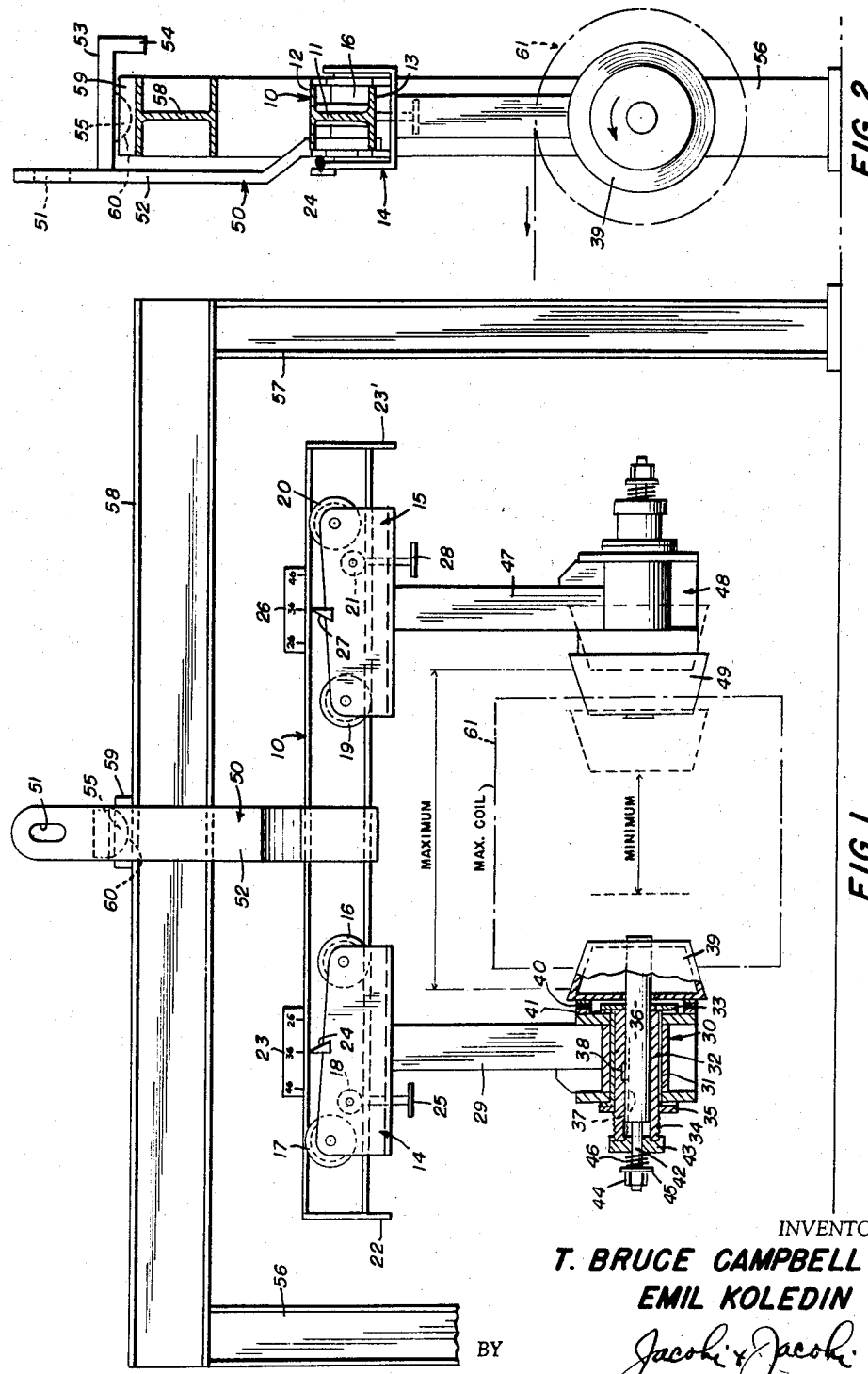
INVENTORS
T. BRUCE CAMPBELL
EMIL KOLEDIN
BY
Jacobi & Jacobi
ATTORNEYS

2,962,241
COMBINED COIL HANDLING AND SELF ALIGNING UNCOILING APPARATUS

Thomas Bruce Campbell, R.D. 2, Pulaski, and Emil Koledin, R.D. 2, West Middlesex, Pa.

Filed Apr. 10, 1959, Ser. No. 805,523

4 Claims. (Cl. 242—79)

This invention relates to material handling and more particularly to a combined coil handling and self aligning uncoiling apparatus for transporting and supporting a coil of strip material to be uncoiled.

It is common practice in the handling of metallic strip material to store the same in coils and when it is desired to utilize such strip material for manufacturing operations or for further operations on the strip material, it is customary to transport the coil of strip material from the storage area to an apparatus for supporting the same in such a manner that the material may be uncoiled and fed to the metal working apparatus which is to operate on the same or for the purpose of cutting strips to be utilized for any desired purpose. Since strip material of the type under consideration may have slight variations in thickness or may vary slightly in length from one side of the strip to the other, considerable difficulty has been experienced in properly uncoiling the same, due to the fact that in some instances the strip will not uncoil in a straight lines, but will tend to move from one side to the other and where the uncoiling apparatus is not provided with means for compensating for this condition, trouble has been experienced in properly handling the strip material. Also in handling coiled strip material of this nature, it is necessary to provide a suitable apparatus for engaging, hoisting and transporting the coil to the uncoiling apparatus and the necessity for providing this additional hoisting and transporting apparatus materially increases the cost of handling coiled strip material and where the coils must be transferred from the hoisting and transporting apparatus to the uncoiling apparatus, the very material expenditure of time is involved. Consequently, it appears that a combined apparatus which will accomplish the hoisting, transporting and uncoiling operations without necessitating release of the coil from the transporting apparatus and installation of the same in the uncoiling apparatus and also one which provides for automatic alignment during the uncoiling operation represents a very significant step forward in the art.

It is accordingly an object of the invention to provide a combined coil handling and self aligning uncoiling apparatus for strip material which may be utilized to transport a coil of strip material from a storage area to an uncoiling location and permit uncoiling of the strip material while automatically compensating for any misalignment of such material during the uncoiling operation.

A further object of the invention is the provision of a combined coil handling and self aligning uncoiling apparatus which may be adjusted to engage coils of strip material of different widths and also such coil having openings of different sizes in the center thereof.

A still further object of the invention is the provision of a combined coil handling and self aligning uncoiling apparatus for strip material including adjustable means for exerting a tension on the coil during unwinding thereof, such means comprising an adjustable brake which may be utilized to provide the desired tension in the strip material during uncoiling thereof.

Another object of the invention is the provision of a combined coil handling and self aligning uncoiling apparatus of relatively simple construction and which may be conveniently and economically constructed from readily available materials and which may be conveniently utilized without modification or change in the apparatus to which the sheet material is to be supplied.

A further object of the invention is the provision of a combined coil handling and self aligning uncoiling apparatus for strip material which will operate to materially reduce the time and effort required in handling coils of sheet material and transporting the same from a storage area to an uncoiling area and controlling the operation thereof during the uncoiling operation.

Further objects and advantages of the invention will be apparent from the following description taken in conjunction with the accompanying drawing wherein:

Fig. 1 is a front elevational view with parts in section for greater clarity and showing a combined coil handling and self aligning uncoiling apparatus constructed in accordance with this invention; and Fig. 2 a side elevational view of the apparatus shown in Fig. 1.

With continued reference to the drawing, there is shown a combined coil handling and self aligning uncoiling apparatus for strip material which may well comprise a cross bar 10 of I beam cross section or other suitable cross section, such beam being provided with a web 11 and upper and lower flanges 12 and 13 respectively. The crossbar 10 serves to provide a trace for mounting a pair of carriages 14 and 15, the carriage 14 being provided with rollers 16 for engaging the upper surface of the lower flange 13 and rollers 17 for engaging the lower surface of the upper flange 12 on the crossbar 10. The carriage 14 may also be provided with other rollers 18 of relatively small diameter spaced from the rollers 16 and also engaging the upper surface of the lower flange 15. The rollers on the carriage 14 serve to mount the same for free sliding movement longitudinally of the crossbar 10.

In a similar manner, the carriage 15 may be provided with rollers 19 for engaging the upper surface of the lower flange 13 and with rollers 20 adjacent the opposite end of the carriage 15 for engaging the lower surface of the upper flange 12 of the crossbar 10. The carriage 15 may also be provided with rollers 21 of relatively small diameter spaced from the rollers 19 and also engaging the upper surface of the lower flange 13. The rollers on the carriage 15 serve to support the same for free sliding movement longitudinally of the crossbar 10. The crossbar 10 may be provided at opposite ends thereof with stop means 22 and 23' for preventing disengagement of the carriages 14 and 15 from the crossbar 10.

A scale 23 having suitable indicia thereon may be mounted on the crossbar 10 intermediate the length thereof at one side and a pointer 24 mounted on the carriage 14 serves to indicate the position of the carriage 14 on the crossbar 10. A set screw 25 threadedly received in the carriage 14 and engaging the crossbar 10 may be utilized to lock the carriage 14 in adjusted position on the crossbar 10.

In a similar manner, a scale 26 may be provided on the crossbar 10 at one side intermediate the length thereof opposite to the scale 23 and a pointer 27 on the carriage 15 serves to indicate the position of the carriage 15 on the crossbar 10. A set screw 28 threadedly received in the carriage 15 serves to engage the crossbar 10 to lock the carriage 15 in adjusted position thereon.

A member 29 depending from the carriage 14 is provided at the lower end thereof with a bearing structure 30, including a bushing 31 for rotatably receiving a sleeve 32 having a flange 33 at the inner end thereof and a threaded portion 34 at the opposite end for threadedly receiving a nut 35 to secure the sleeve 32 in position in the bushing 31. Slidably mounted in the sleeve 32 is a shaft 36 having a key way 37 therein for receiving a key 38 fixed in the sleeve 32 for preventing relative rotation between the sleeve 32 and the shaft 36. At the inner end of the shaft 36 is a cone 39 and provided on the outer side of the cone 39 is a brake ring 40 engaging a brake ring 41 fixed to the bearing structure 30 on the lower end of the member 29. The outer end of the shaft 36 terminates in a rod or stud 42 of reduced diameter extending through a washer 43 engaging the outer end of the sleeve 32 and threadedly received on the outer end of the rod 42 is a nut 44 engaging a washer 45 which in turn engages a compression spring 46 disposed between the washer 43 and the washer 45. Obviously, adjustment of the nut on the rod 42 will serve to compress the spring 46 and at the same time, vary the pressure exerted by the brake ring 40 carried by the cone 39 on the brake ring 41 fixed to the bearing structure 30. In this manner an adjustable drag is provided for controlling the rotation of the cone 39.

In a similar manner, the carriage 15 is provided with a depending member 47 to the lower end of which is attached a bearing structure 48 in which is rotatably mounted a cone 49 and provided with adjustable means for controlling the rotation thereof, such means having the same structure as that described above in connection with the structure on the lower end of the member 29 depending from the carriage 14 and for this reason no useful purpose is seen in describing in detail the structure on the lower end of the member 47 depending from the carriage 15.

A suspension bar 50 is secured to the crossbar 10 midway of the length thereof and the suspension bar 50 extends upwardly and is provided at the upper end with an aperture 51 for receiving the hook or other attaching means of a hoisting apparatus. From an inspection of Fig. 2, it will be seen that the major upper portion 52 of the suspension bar 50 is offset away from the crossbar 10 and attached to the offset portion 52 of the suspension bar 50 is a bracket 53 which projects over the crossbar 10 and is provided at the end thereof with a downwardly projecting flange 54. Provided on the lower surface of the bracket 53 is a hemispherical boss 55 and the lowermost point of this boss is in alignment with the axis of the cones 39 and 49.

A supporting structure for the uncoiling apparatus of this invention is provided in the form of uprights 56 and 57 which serve to support a cross member 58 at a suitable elevation and provided on the upper surface of the cross member 58 is block 59 having in the upper surface thereof a hemispherical socket 60 which is complementary to the hemispherical boss 55.

In operation, a hoisting apparatus is engaged with the aperture 51 on the suspension bar 50 and the coil handling and uncoiling apparatus transported to the coil storage area while the carriages 14 and 15 are separated in such a manner that the cones 39 and 49 may be passed downwardly along the sides of a coil 61 of strip material and upon aligning the cones 39 and 49 with the center of this coil 61, the cones 39 and 49 are moved inwardly to engage the center opening in the coil 61 in such a manner as to firmly support the coil 61 on the cones 39 and 49. The carriages 14 and 15 by means of the scales 23 and 26 and the pointers 24 and 27 are adjusted to center the same on the crossbar 10 and in this manner the coil 61 may be hoisted and transported to the uncoiling location. At this point, the bracket 53 is disposed over the cross member 58 in such a manner that upon lowering of the coil handling and uncoiling apparatus, the spherical boss 55 is received in the spherical socket 60 on the cross member 58 and through the bracket 53 and suspension bar 50, the coil 61 is supported in such a manner that the same may swing freely in any direction. The nut 44 on the rod 42 is adjusted to provide the desired pressure between the brake rings 40 and 41 in order to exert a drag on the coil 61 thereby maintaining the strip material under the desired tension during the uncoiling operation. In the event the strip material does not run in a straight line, the entire apparatus may swing in the desired direction to compensate for the same, such swinging movement as mentioned above being provided by the spherical boss 55 in the spherical socket 60. Obviously the cones 39 and 49 serve to accommodate the coils 61 having central openings therein of different diameters and the carriages 15 and 14 provide for accommodating coils of material of different widths.

It will be seen that by the above described invention there has been provided a combined coil handling and self aligning uncoiling apparatus which may be utilized to transport a coil of strip material from the storage area to an uncoiling location and which will serve to permit proper uncoiling of the material regardless of variations therein which might cause the same to deviate from a straight line and also to provide the proper tension in the uncoiling strip material. This apparatus thus performs both the operation of transporting the coil and also for supporting the same during the uncoiling operation thereby precluding the necessity from transferring a coil from a transporting apparatus to an uncoiling apparatus. Since the coils handled by the apparatus of this invention may weigh as much as 60,000 pounds each, it would seem that an apparatus which expedites such operation represents a significant contribution to the art.

It will be obvious to those skilled in the art that various changes may be made in the invention without departing from the spirit and scopes thereof and therefore the invention is not limited by that which is shown in the drawing and described in the specification, but only as indicated in the appended claims.

What is claimed is:

1. A combined coil handling and self aligning uncoiling apparatus for transporting and supporting a coil of strip material to be uncoiled, said apparatus comprising a crossbar, a pair of carriages slidably mounted on said crossbar for longitudinal relative movement, means for fixing each carriage in adjusted position on said crossbar, a member depending from each carriage, opposed coil engaging means rotatably mounted on the lower end of each member, each coil engaging means comprising a transverse bearing mounted on said member with the axis of said bearing member in the plane of said crossbar, a sleeve rotatably mounted in said bearing and projecting outwardly therefrom at the outer end, said sleeve being fixed against axial movement in said bearing, a shaft slidably and non-rotatably received in said sleeve, a coil engaging cone on the inner end of said shaft, a friction ring mounted on said member and engaging the outer end face of said cone to provide a brake, a threaded stud fixed to the outer end of said shaft and projecting outwardly of said sleeve, a washer received on said stud and engaging the outer end of said sleeve, a compression spring received on said stud and engaging said washer and a nut threadedly received on said stud and engaging said spring, whereby said brake may be adjusted to vary the resistance to uncoiling of a coil supported on said cones, a suspension bar secured to said crossbar substantially at the center and extending upwardly therefrom, the upper end of said suspension bar having an aperture for receiving a hoisting means, a bracket secured to said suspension bar and projecting over said crossbar, a hemispherical boss on the lower surface of said bracket, said suspension bar being offset to position the lowermost point of said boss in alignment with the axis of said cones, a supporting structure and a hemispherical socket on the upper surface of said supporting structure, whereby said boss may be received in said socket to support the coil positioned between said coil and permit free swinging of said coil in all directions during uncoiling thereof.

2. A combined coil handling and self aligning and uncoiling apparatus for transporting and supporting a coil of strip material to be uncoiled, said apparatus comprising a crossbar, a pair of carriages slidably mounted on said crossbar for longitudinal relative movement, a member depending from each carriage, opposed coil engaging means rotatably mounted on the lower end of each member, each coil engaging means comprising a transverse bearing mounted on said member with the axis of said bearing in the plane of said crossbar, a sleeve rotatably mounted in said bearing and projecting outwardly therefrom at the outer end, said sleeve being fixed against axial movement in said bearing, a shaft slidably and non-rotatably received in said sleeve, a coil engaging cone on the inner end of said shaft, a friction ring mounted on said member and engaging the outer end face of said cone to provide a brake, a threaded stud fixed to the outer end of said shaft and projecting outwardly of said sleeve, a washer received on said stud and engaging the outer end of said sleeve, a compression spring received on said stud and engaging said washer and a nut threadedly received on said stud and engaging said spring, whereby said brake may be adjusted to vary the resistance of uncoiling of a coil mounted on said cones, a suspension bar secured to said crossbar substantially at the center and extending upwardly therefrom, the upper end of said suspension bar having an aperture for receiving a hoisting means, a bracket secured to said suspension bar and projecting over said crossbar, a hemispherical boss on the lower surface of said bracket, said suspension bar being offset to position the lowermost point of said boss in alignment with the axis of said cones, a supporting structure including a cross member and a hemispherical socket on the upper surface of said cross member, whereby said boss may be received in said socket to support a coil positioned between said cones and permit free swinging of said coil in all directions during uncoiling thereof.

3. A combined coil handling and self aligning uncoiling apparatus for transporting and supporting a coil of strip material to be uncoiled, said apparatus comprising a crossbar, a pair of carriages slidably mounted on said crossbar for longitudinal relative movement, a member depending from each carriage, opposed coil engaging means rotatably mounted on the lower end of each member, each coil engaging means comprising a transverse bearing mounted on said member with the axis of said bearing in the plane of said crossbar, a shaft rotatably received in said bearing, a coil engaging cone on the inner end of said shaft, a friction ring mounted on said member and engaging the outer end face of said cone to provide a brake, a threaded stud fixed to the outer end of said shaft and projecting outwardly of said sleeve, a washer received on said stud and engaged on said bearing, a compression spring received on said stud and engaging said washer and a nut threadedly received on said stud and engaging said spring, whereby said brake may be adjusted to vary the resistance to uncoiling of a coil supported on said cones, a suspension bar secured to said crossbar substantially at the center and extending upwardly therefrom, means on said suspension bar for receiving a hoisting means, a bracket secured to said suspension bar and projecting over said crossbar, a convex boss on the lower surface of said bracket, said suspension bar being offset to position the lowermost point of said boss in alignment with the axis of said cones, a supporting structure including a crossbar and a concave socket on the upper surface of said cross member, whereby said boss may be received in said socket to support a coil positioned between said cones and permit free swinging of said coil in all directions during uncoiling thereof.

4. A combined coil handling and self aligning uncoiling apparatus for transporting and supporting a coil of strip material to be uncoiled, said apparatus comprising a crossbar, a pair of carriages slidably mounted on said crossbar for longitudinal relative movement, a member depending from each carriage, opposed coil engaging means rotatably mounted on the lower end of each member, each coil engaging means comprising a transverse bearing mounted on said member with the axis of said bearing in the plane of said crossbar, a shaft rotatably received in said bearing, a coil engaging cone on the inner end of said shaft, adjustable brake means to vary the resistance to uncoiling of a coil supported on said cones, a suspension bar secured to said crossbar substantially at the center and extending upwardly therefrom, means on said suspension bar for receiving a hoisting means, a bracket secured to said suspension bar and projecting over said crossbar, a convex boss on the lower surface of said bracket, said suspension bar being offset to position the lowermost point of said boss in alignment with the axis of said cones, a supporting structure including a cross member and a concave socket on the upper surface of said cross member, whereby said boss may be received in said socket to support a coil positioned between said cone and permit free swinging of said coil in all directions during uncoiling thereof.

References Cited in the file of this patent
UNITED STATES PATENTS

| | | |
|---|---|---|
| 1,785,248 | Busey | Dec. 16, 1930 |
| 2,801,057 | Rayburn | July 30, 1957 |
| 2,822,139 | Sarka | Feb. 4, 1958 |